United States Patent [19]

Brass et al.

[11] Patent Number: 4,782,221

[45] Date of Patent: Nov. 1, 1988

[54] PRINTED DATA STRIP INCLUDING BIT-ENCODED INFORMATION AND SCANNER CONTROL

[75] Inventors: Robert L. Brass, Westport; John Glaberson, Stratford; Richard W. Mason, Cos Cob; Scott Santulli, Danbury; G. Thomas Roth, Fairfield, all of Conn.

[73] Assignee: Cauzin Systems, Incorporated, Waterbury, Conn.

[21] Appl. No.: 779,062

[22] Filed: Sep. 23, 1985

Related U.S. Application Data

[63] Continuation-in-part of Ser. No. 718,173, Apr. 1, 1985, abandoned.

[51] Int. Cl.$^4$ ............................................. G06K 19/06
[52] U.S. Cl. ..................................... 235/494; 235/454; 235/487
[58] Field of Search ................ 235/454, 487, 494, 462

[56] References Cited

U.S. PATENT DOCUMENTS

| 3,660,641 | 5/1972 | Levasseur | 235/494 |
| 3,845,279 | 10/1974 | Rosdorff | 235/494 |
| 4,254,329 | 3/1981 | Gokey et al. | 235/454 X |
| 4,263,504 | 4/1981 | Thomas . | |

FOREIGN PATENT DOCUMENTS

| 1248981 | 3/1963 | Fed. Rep. of Germany . |
| WO85/02284 | 5/1985 | PCT Int'l Appl. . |
| 968808 | 9/1964 | United Kingdom . |
| 1168857 | 10/1969 | United Kingdom . |

Primary Examiner—David L. Trafton
Attorney, Agent, or Firm—Haynes N. Johnson

[57] ABSTRACT

A printed data strip (7) on a substrate (5) is provided including bit encoded information (23) and control information (15, 19, 27, 29) for an optical scanner. The encoded information is in a plurality of parallel, contiguous data lines (11) formed of bits of sequentially-encoded information, the bits being of uniform height and width. The data lines (11) start along a common line and, together, form an information portion (23) of sequentially-encoded data. The data lines (11) are transverse to the longitudinal dimension of the data strip (7).

Associated with the encoded information on the printed substrate (5) are printed areas serving preliminarily to align the optical scanner with the data lines (17), and to set contrast levels (17), to maintain alignment during scanning (27, 29), and to set the vertical (19) and horizontal (15) rates of scanning. Means are provided to control and adjust the timing of each scanned data line by the optical scanner during the course of scanning.

19 Claims, 2 Drawing Sheets

PRINTED DATA STRIP INCLUDING BIT-ENCODED INFORMATION AND SCANNER CONTROL

BACKGROUND OF THE INVENTION

This application is a continuation-in-part of our co-pending application Ser. No. 718,173 filed Apr. 1, 1985 and now abandoned.

This invention relates to a system for encoding data by printing bits of information on paper or other substrate, which encoding serves not only to convey information when scanned by a reader but also to control the alignment of an optical scanner used for reading and to control the rate of scanning.

Prior printed systems include bar codes which are a series of parallel printed lines so spaced and dimensioned as to convey information when scanned transversely. Due to the limited quantity of information encoded in a bar code, the rate of scanning and the positon of the scanner along the length of the line is not critical.

A scanned bar code is disclosed in Wilson U.S. Pat. No. 3,211,470 for use on a coded coupon. The disclosure relates to a bar code, and includes certain redundancy features both for convenience of use and for generating missing data in the event of partial destruction. Other such codes and recognition techniques are found in Seligman U.S. Pat. No. 4,059,224 and Bullis U.S. Pat. No. 4,308,455. Salaman U.S. Pat. No. 4,439,672 discloses another form of code on a strip chart hundreds of feet long. A form of scanner control based upon scanned data is found in Dolch U.S. Pat. No. 3,852,573.

By contrast, the present invention relates to the reading of a series of contiguous and parallel "data lines" which are preferably read in sequence and each of which is made up of a series of areas of predetermined size and of uniform height and width, called "bit areas". The bit areas are either printed or blank and so, by the presence or absence of printing, provide bits of information. The totality of the data lines and associated data form a data strip which can be read by optically scanning the data lines sequentially from one end of the data strip to the other.

Sequential scanning requires that the scanner be aligned in the direction of the data lines and that timing of the scanning both vertically and horizontally be controlled. To this end, the data strip of this invention includes printed data to control the scanner.

BRIEF SUMMARY OF THE INVENTION

This invention relates to a "data strip" 7 having bit-encoded information for optical scanning by a reader 1 and additional data for control of the optical scanner during reading.

The principal portion of the data strip 7 consists of an information portion 23 made up of a series of parallel and contiguous data lines 11 of uniform length. The data lines each include the same number of bit areas, the bit areas being contiguous and of approximately uniform height and width. By way of example, each bit area could be generally rectangular and measure about 0.25 mm (0.010 inches) in each dimension. Other shapes or dimensions could be used. Preferably, the data is encoded sequentially from the leading end of the information section 23 to the other end and sequentially along each data line 11, but other sequences may be used depending upon the software in the reader.

Each of these bit areas is either imprinted or blank, thus defining "bits" of information.

The data lines, such as lines 11, together provide an encoded information portion 23 having a longitudinal dimension running perpendicularly to (transversely of) the data lines 11 and including the desired encoded information. Preferably the data is encoded sequentially and, in use, the data strip is scanned for that information by scanning the individual data lines beginning at the upper end of the information portion and running to the other end of the information portion.

The information portion has alignment guidelines (27, 29) running longitudinally of the data strip along opposite ends of said data lines. These lines have patterned shapes congruent with (aligned with) the data lines to provide control information for the scanner. This control information is used by the reader to maintain or derive continuous scanner alignment with the data lines during scanning.

Preceding the information portion are (a) a horizontal synchronization section 15 and (b) a vertical synchronization section 19. These sections together may be referred to as the "header". Encoded in the horizontal synchronization section 15 is data as to the number of bit areas in each line, data enabling the scanner to align itself so it will scan each data line in a direction as nearly parallel to the line as possible, and data for setting threshold levels relating to the contrast between paper and ink color. Encoded in the vertical synchronization section is information as to the height of the bit areas.

DETAILED DESCRIPTION OF THE DRAWINGS

DETAILED DESCRIPTION OF THE DISCLOSURE

The data strip 7 of this invention is preferably printed on a sheet of paper or other substrate 5, such as cardboard. "Printed", as used herein, refers to the result of any satisfactory customary printing process, photographic process, or other technique adequate to lay down the desired bit pattern on the substrate with sufficient detail and accuracy to be functional in an optical scanner.

Figure 1:
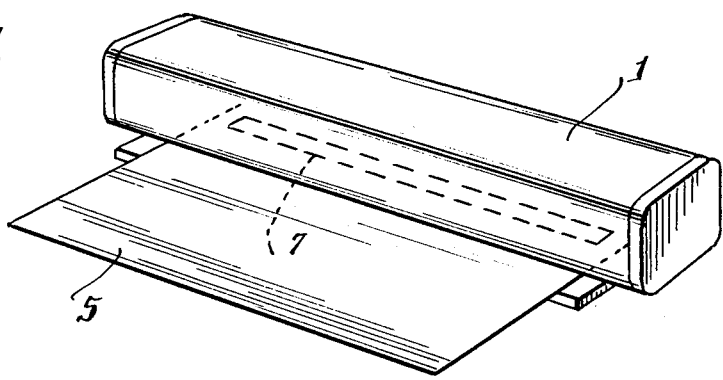
FIG. 1 is a perspective view of a reader containing an optical scanner and holding a sheet of paper bearing a data strip.
Figure 2:
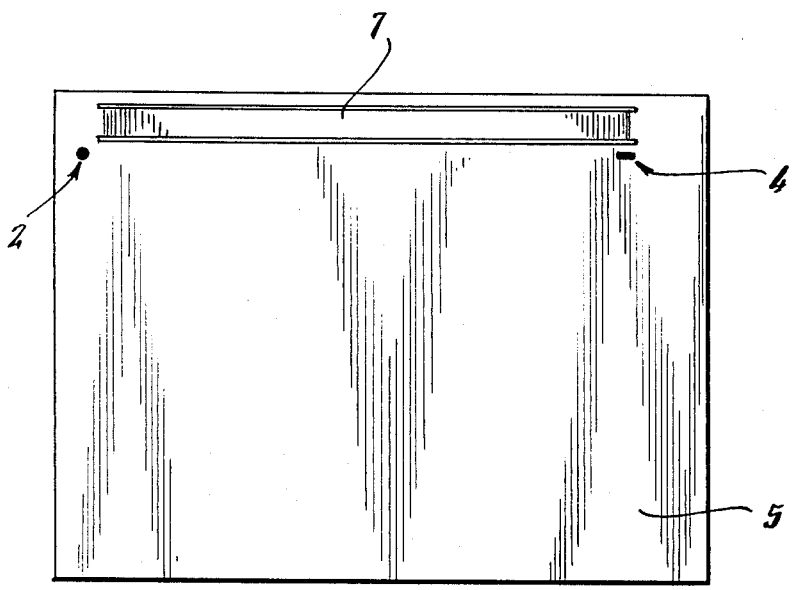
FIG. 2 is a plan view of a sheet of paper with an imprinted data strip.

One preferred form of the data strip 7 is to print it along and parallel to one margin of a sheet of paper, as shown in FIG. 2.

The scanner used with the data strip 7 of this invention may be housed in a reader 1 having means, such as alignment guides, to receive and hold a sheet of paper or other substrate 5 during scanning. Data strip 7 may include alignment marks 2 and 4 printed on substrate 5 parallel to the edge of data strip 7. Leading mark 2 is usually ahead of and to one side of data strip 7 (so as not to interfere with scanning); and terminal mark 4 is near the end of data strip 7. Marks 2 and 4 are preferably of different shape (such as a dot and a rectangle) to identify them; and reader 1 may carry corresponding alignment means.

The optical scanner (not part of the present invention) is housed within reader 1 and is adapted to scan the data strip 7 positioned underneath it. The scanner is disclosed in copending patent application Ser. No. 718,219, filed Apr. 1, 1985, now U.S. Pat. No. 4,692,603 for Optical Reader for Printed Bit Encoded Data and Method of Reading Same, assigned to the same assignee as the present application. Its disclosure is incorporated herein by reference. The scanning is from one end of data strip 7 to the other, starting at the header and scanning the plurality of data lines one at a time.

Control mechanisms within the optical scanner are designed to respond to, and to be controlled by, information received by the scanning of data strip 7. Accordingly, the scanner not only scans the data strip, but the nature of the scanning is functionally controlled by information received from the data strip.

The optical scanner used for scanning and reading the data strip 7 should include means for positioning the angle of the scanner relative to the data strip 7 to make the scanning line substantially parallel to data lines 11. It may also include means for adjusting its scanning rate to correspond to the number of bit areas of information in a data line, the length of the line, and the height and width of the bit areas. (By "height" is meant the length of a bit area in the longitudinal direction of data strip 7, that is, perpendicular to the length of the data line 11; and by "width" is meant the length of a bit area across data strip 7, that is, in the direction of the length of data lines 11). The bit areas are normally contiguous to one another and are aligned in the direction perpendicular to said data lines.

A typical data strip 7 on a sheet of paper 5 is shown in FIG. 2. Strip 7 might be about 16 mm (⅝ inch) wide and about 255 mm (10 inches) long, imprinted near the edge of a sheet of 215 mm×280 mm (8½ by 11 inch) paper. Strip 7 may parallel the edge of the paper at a predetermined distance from it. Leading alignment mark 2 and terminal alignment mark 4 in conjunction with alignment marks or other means on reader 1, permit easy and exact positioning of the strip 7.

Figure 3:
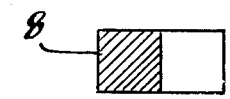
FIG. 3 is an example of the two types of bits of information ("dibits") utilized in the information portion.
Figure 3:

The encoded information on data strip 7 is found in encoded information portion 23. It is encoded in the form of "dibits" using pairs of adjacent bit areas. The two forms of acceptable dibits are shown in FIG. 3 and can either be black-white 8 (binary 0̸) or white-black 9 (binary 1). Black-black and white-white are unacceptable to the dibit system and, when read, indicate error. Thus, in the preferred system, one bit of information is obtained from each dibit, i.e., from each of the contiguous pairs of bit areas.

Figure 4:
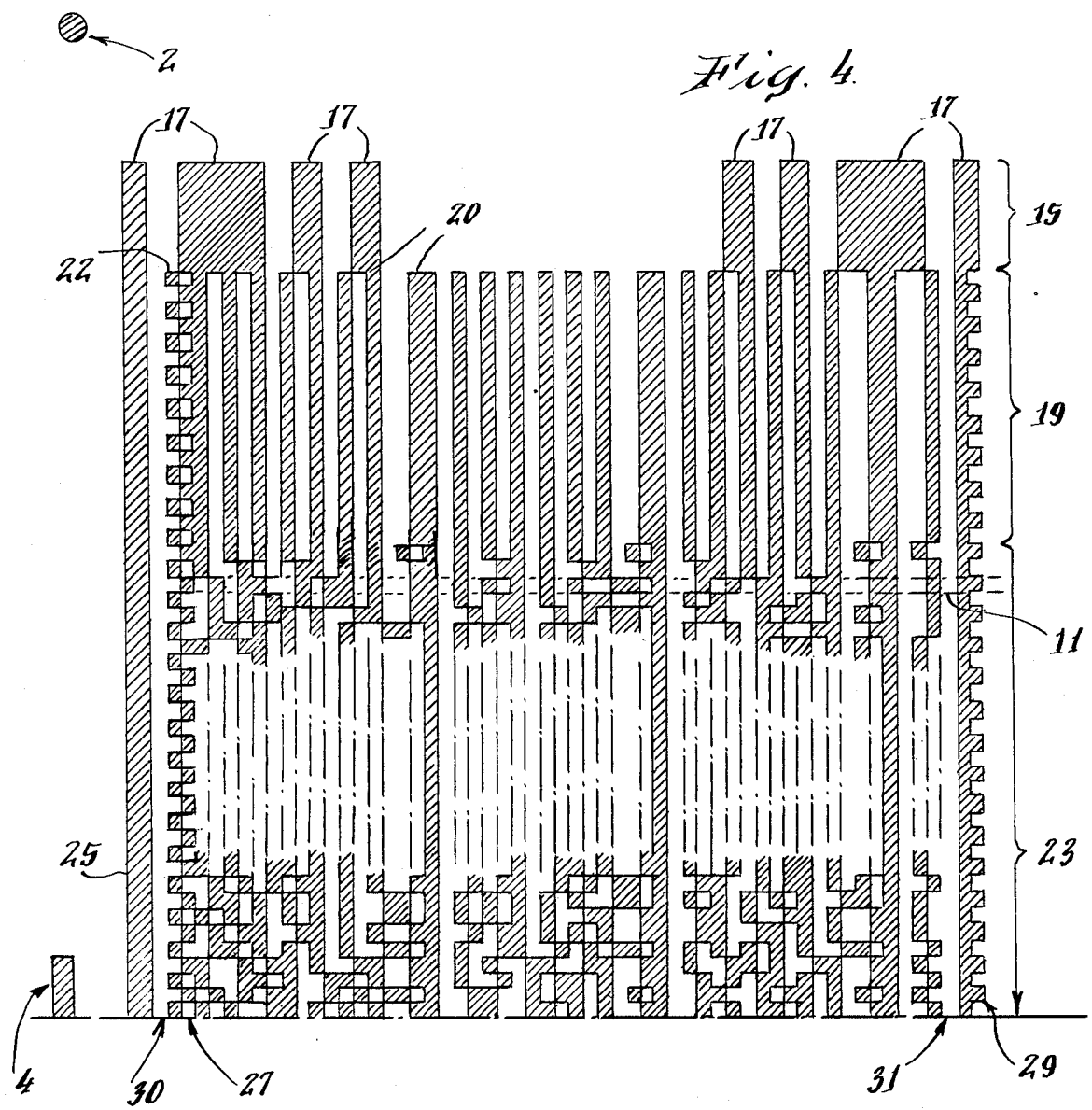
FIG. 4 is an enlarged view of a portion of a data strip showing the horizontal synchronization section, the vertical synchronization section, part of the encoded information portion, the alignment guidelines, and the start line. The longitudinal direction of the data strip is vertical in FIG. 4.

FIG. 4 shows the upper end portion of a data strip 7. It includes three sections running across the strip: a horizontal synchronization section 15; followed by a vertical synchronization section 19; followed by the encoded information portion 23.

Figure 5:
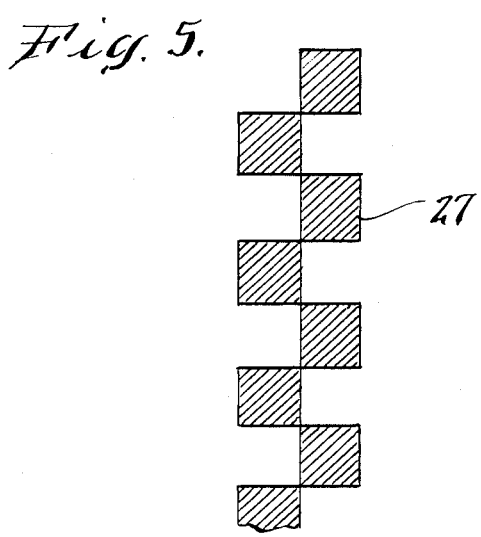
FIG. 5 is a portion of the left-hand guideline showing a pattern shape that is congruent with the data lines.
Figure 6:
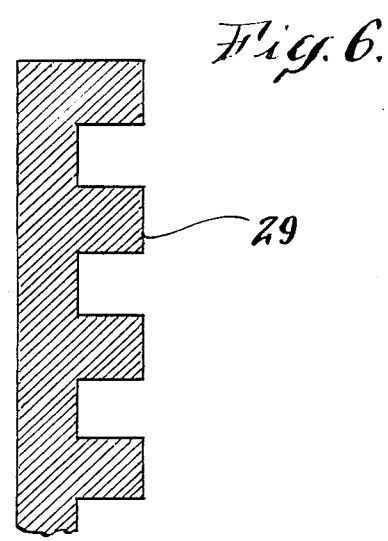
FIG. 6 is a portion of the right-hand guideline also showing a pattern shape that is congruent with the data lines.
Figure 1:
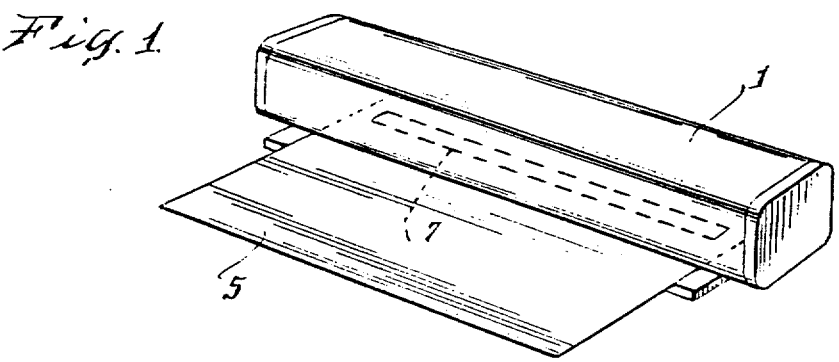
Figure 2:
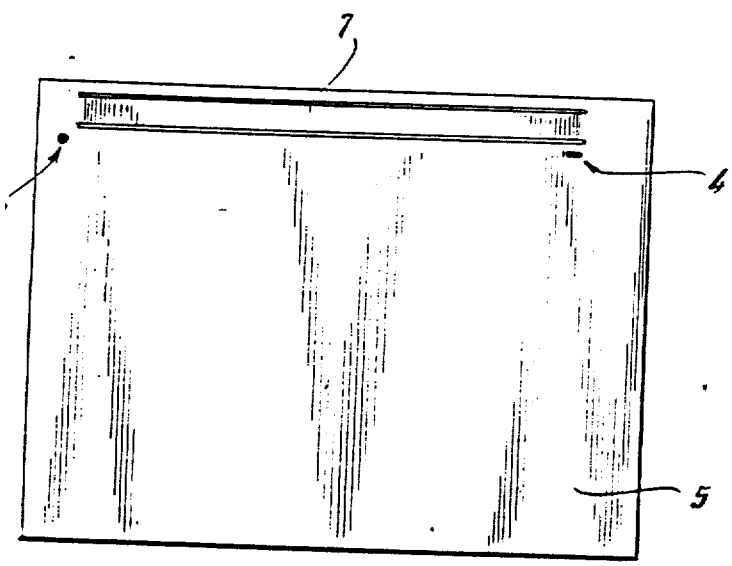
Figure 3:
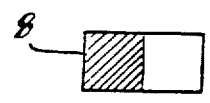
Figure 3:
Figure 4:
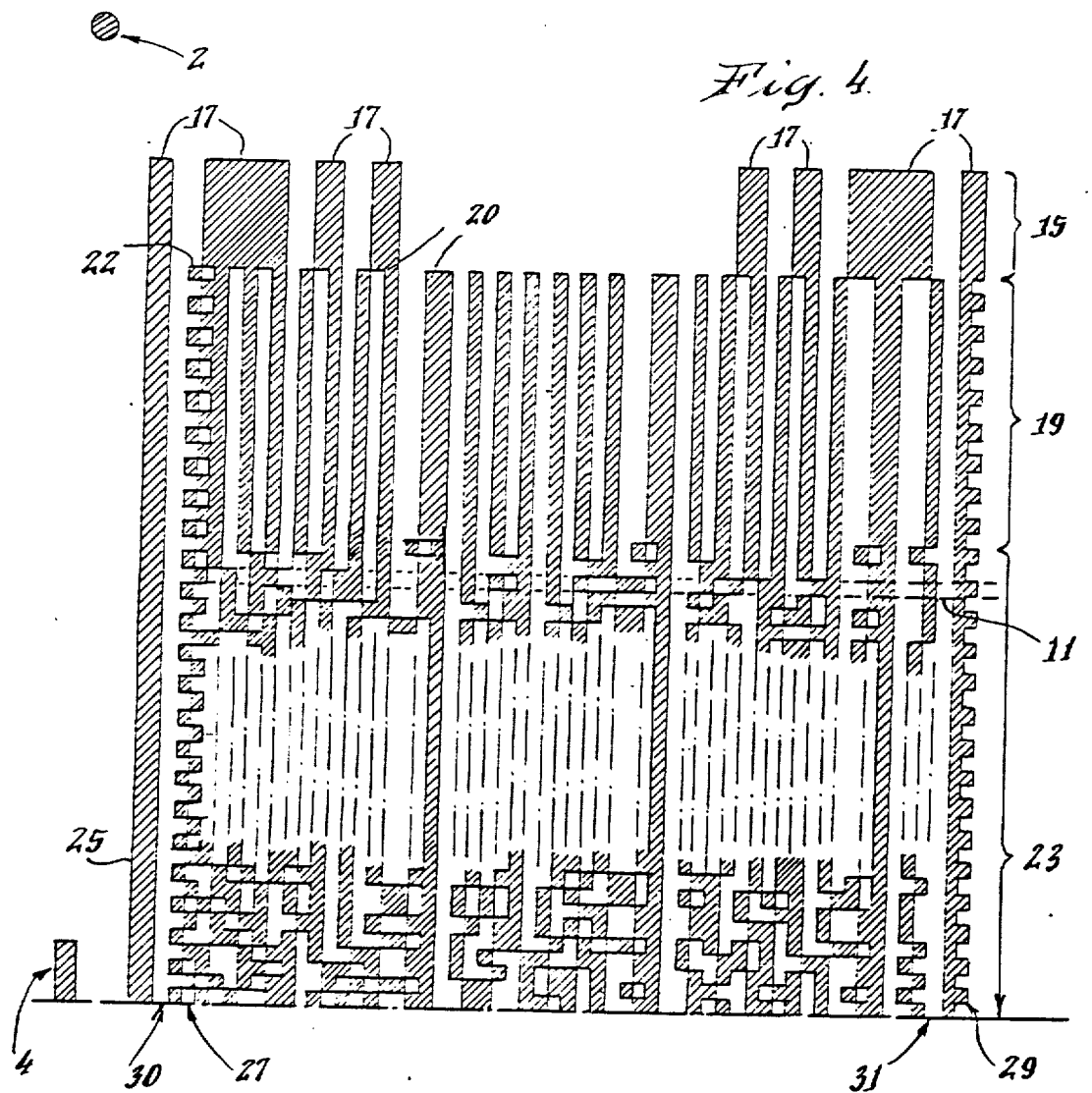
Figure 5:
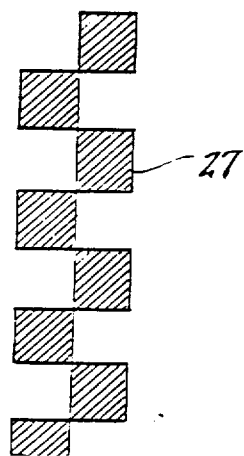
Figure 6:
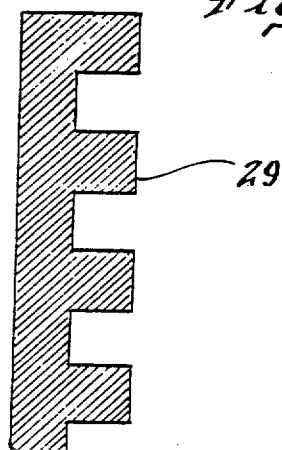

Running longitudinally along the left edge of information portion 23 is a start line 25. Line 25 may be viewed as having a black (B) region one dibit wide, followed by a one bit white (W) region. Alternatively, it may be viewed as being one W/B dibit followed immediately by one B/W dibit; including a one bit space 30. Following space 30 is a checkerboard-patterned alignment guideline 27, one dibit wide (shown in enlarged form in FIG. 5). Running longitudinally along the right edge of portion 23 is patterned alignment guideline 29, one dibit (or 3 bits) wide, spaced one or two bits 31 from the information portion 23 and having the configuration shown in FIG. 6. Preferably, line 25 also runs along sections 15 and 19. Line 27 runs along section 19. Line 29 also runs along sections 15 and 19, but line 29 is solid and one dibit wide along section 15.

Alignment guidelines 27 and 29 have configurations that are congruent with and conform to the heights of the bit areas in each data line. That is, the bit areas in these lines 27 and 29 are of the same height as the bit areas in the data lines 11 and are in alignment with them. The scanner can compare the phase of the information received from lines 27 and 29 at each end of data lines 11 and use it to adjust the angle of scanning relative to the data lines 11 to the extent necessary to keep the scanning parallel to the data strip while it is being read. Start line 25 is used by the scanner to synchronize the beginning of the reading of each data line 11.

The encoded information to be read is found in the encoded information portion 23 running between lines 27 and 29. Each transverse, horizontal line of dibits 8 and 9 is what has previously been referred to as data line 11. That is, the totality of dibits in the bit areas along any one of the data lines 11 forms that data line. Each pair of bits running sequentially along the data line represents a dibit of information except that, preferably, the end dibits of each data line 11 are used for parity checks. For example, one parity check is based upon the sum of alternate dibits in each dibit line and the other is based upon the sum of the other, interleaved, half of the dibits. This is disclosed in detail in the referenced copending application. If desired, check-sum error detection may also be provided.

As can be seen from FIG. 4, there are a plurality of data lines 11 and these are formed of contiguous bit areas (or dibits) of uniform height and width. Lines 11 are all of the same length, parallel, contiguous, and start along a common line. Together, they form a block defining encoded information portion 23. Preferably, information is encoded sequentially along each data line 11, and sequentially along contiguous data lines, beginning at the top of encoded portion 23 and running to the bottom of portion 23, though other sequencing may be used.

The number of dibits shown in data lines 11 o FIG. 4 is an example of what might be used in actual practice, though many more data lines 22 are often used. Leading alignment mark 2 is in a predetermined position relative to the header. Terminal alignment mark 4 may be correctly shown in FIG. 4 or may be in a different position, as long as its perpendicular distance from line 25 remains the same. As a result, marks 2 and 4 may be used in conjunction with alignment means on reader 1 to position data strip 7.

The height of the bit areas (width of the data lines 11) normally ranges from about 0.25 mm to about 0.9 mm (0.010 inch to 0.035 inch). The width of the bit areas normally ranges from about 0.15 mm to about 0.43 mm (0.006 inch to 0.017 inch). The width of a dibit would be double this, as seen in FIG. 3. A high density strip might have bit areas measuring 0.25 mm high by 0.15 mm wide (0.01 inch by 0.006 inch), with a 0.30 mm dibit width. A low density strip might have bit areas 0.50 mm high by 0.38 mm wide (0.02 inch by 0.015 inch), with a 0.75 mm dibit width. If the encoded information area is 102 mm (4 inches) long and 16.5 mm (0.65 inch) wide (length of data lines), such low density encoding would provide 16 dibits per data line and 204 data lines, for a total of 3,264 dibits of encoded information.

The upper end of data strip 4 is the horizontal synchronization section 15. This is used to present data to the reader during initial optical scanning and serves to cause the reader to adjust its scanning line angle so that it is substantially parallel to data lines 11 so that the scanning will be most accurate. Section 15 is also used to compare the brightness of the paper or other substrate with that of the printed matter, so that contrast (threshold) adjustments may be set, and to set the bit areas per line in the reader control.

Encoded in the horizontal synchronization section 15 is the number of nibbles per line 11 in section 19 and information portion 23. A "nibble" is defined as four data bits. Reading from left to right across the horizontal synchronization section 15, the reader encounters a series of white to black transitions. In the illustration of FIG. 4 there are eight such transitions beginning with line 25 through guideline 29. The number of intersections plus four and divided by two gives the number of nibbles. In the illustrated strip, there would be (8+4=6/2) nibbles per data line 11. The number of nibbles so encoded does not include the parity bits but only refers to actual data bits between the parity bits.

Section 15 is symmetrical from one side to the other, and has an even number of bars 17, at least four of them across the width of the strip. The two broader bars are three dibits wide, the others are one dibit wide with one dibit spacing. The upper ends of bars 17 run transversely of data strip 7 and have upper edges which are horizontally aligned parallel to data lines 11. By scanning bars 17, determining the center of section 15, and determining which end of a scan line first intersects the bars, information is presented to the reader relative to the direction and amount of tilt of the data strip 7 and a coarse tilt adjustment of the scanning angle is made by the scanner. The scanner is designed to reverse its direction and go back to the upper ends of bars 17, repeat its readings to determine adequacy of tilt adjustment, and to repeat this step until the scanning line angle is substantially parallel to data lines 11.

The widest of bars 17 is used to measure the reflectance of the printed areas at the relevant wavelengths. The nonprinted area above bars 17 is used to measure the reflectance of the substrate. The two measurements indicate contrast. Based upon this contrast, threshold levels are established during the time the scanning is proceeding down bars 17 of the data strip.

Vertical synchronization section 19 is between horizontal synchronization section 15 and encoded information portion 23. It will be noted that alignment guidelines 27 and 29 run along the edges of that section with their "zero crossings" aligned. This is described in detail in the referenced copending application. This enables any shift in phase occurring along one data line 11 to be detected so that tilt can be continuously corrected.

The height of the dibits in each data line 11 is encoded in portion 19 by means of a dibit code in bars 20 running longitudinally of data strip 7. The code is an 8-bit number, giving a total of 256 possible bit area heights. This number is split into nibbles, where the upper nibble is scans and the lower nibble is sixteenths of a scan. For example, the number 40 hex means four scans per bit. The number 48 hex means four and eight sixteenths scans per bit. The data is laid out on the strip to conform.

The scan step distance is 0.0635 mm (0.0025 inch). The horizontal synchronization section 15 is 28 scans, or 1.78 mm (0.07 inch) long. The vertical synchronization section 19 is 56 scans, or 3.56 mm (0.14 inch) long.

Preferably, infrared absorbent materials are used for printing the data strip. In such case an infrared light source would be used and infrared detectors would be provided in the optical scanner. The use of infrared light has the advantages that signal-to-noise ratios are increased and that the data strip 7 may, if desired, be camouflaged by being overprinted with dark ink or dye that is transparent to infrared.

In operation, paper 5 carrying data strip 7 is placed within reader 1 containing the optical scanner and is generally aligned using alignment marks 2 and 4 in conjunction with corresponding alignment means on the reader. When the reader is turned on, the optical scanner first scans horizontal synchronization section 15 beginning from above the upper end of data strip 7 and adjusts its angle of scan so that it will scan parallel to the data lines 11. The scanner will reverse itself and pass over the upper ends of bars 17 several times before the adjustment is complete. During this time it receives information as to threshold level, strip width, and number of bit areas per data line.

The scanner then continues scanning down data strip 7 through vertical synchronization section 19. In this section it receives information from bars 20 as to the height of the dibit areas in data lines 11 within encoded information portion 23. (Note that the length of the bars 20 is such as to allow time for the reader to make the necessary internal adjustments prior to reaching the information section 23). Additional tilt adjustments may be made by scanning alignment guidelines 27 and 29.

Information to start reading encoded information may be encoded in the first few data lines 11 in information portion 23. The first three bytes must have a value of zero. The following two bytes are the number of bytes on this particular strip—encoded in the form "low byte-high byte". (There may be a space between the lower end of bars 20—the lower end of section 19—and the beginning of the data lines 11 of encoded information to clue the reader 1 that the vertical synchronization section 19 has been passed and that the scanner is about to enter portion 23 in which it will read the encoded information. However, preferably section 19 and section 23 abut as shown in FIG. 4).

When the scanner moves down data strip 7 to the point where it is over encoded information portion 23, it begins scanning a data line 11. (The data is, preferably, encoded sequentially along each data line 11 and also sequentially from the top of portion 23 to its end.) Normally, the reader will scan each line a plurality of times, such as three or four, and utilize the data from only one of the scans, i.e., the data from a scan which appears to be accurate after parity and other checks. Also, during the scanning, the scanner's timing is adjusted each time it scans start line 25 and the angle of scan is checked and adjusted from reading alignment guidelines 27 and 29.

During one scan of encoded information portion 23, the scanner will scan, in this sequence:
(a) A one dibit width start line 25;
(b) A one bit space 30;
(c) One dibit of checkerboard guideline 27;
(d) A one dibit parity check;
(e) Numerous dibits of encoded information;
(f) A one dibit parity check;
(g) A one or two bit space 31; and
(h) One dibit (or 3 bits) of guideline 29.

It will be apparent that a number of variations and modifications may be made in this invention without departing from its spirit and scope. Accordingly, the foregoing description is to be construed as illustrative only, rather than limiting. This invention is limited only by the scope of the following claims.

What is claimed is:

1. A data strip containing a plurality of encoded data bits for scanning by an optical scanner, said strip including
a paper-like substrate,
a plurality of aligned, contiguous, parallel data lines, each said line being formed of contiguous bit areas, information being enclodeed in said bit areas by the presence or absence of printing thereon, and said bit areas being of uniform and predetermined height and width, the height thereof defining the width of said data line, said data lines running transversely of the longitudinal direction of said data strip, and
said plurality of data lines together defining an encoded data portion of said data strip, said data lines being an integrated whole, with said data lines being so interrelated that the totality of information carried within said data portion in said data strip is sequential from each said data line.

2. A data strip as in claim 1 wherein said data lines are of uniform length and start along a common line, and wherein the bit areas of the plurality of data lines are aligned in direction perpendicular to said data lines and parallel to said common line.

3. A data strip as in claim 1 including printed alignment patterns at each end of said data lines for controlling alignment of said optical scanner relative to said data lines, said alignment patterns being formed of bit areas of the same height and width as the said bit areas of said data lines.

4. A data strip containing a plurality of encoded data bits for scanning by an optical scanner, said strip including
a sheet-like substrate,
a plurality of aligned, contigous, parallel data lines, each said line being formed of bit areas, information being encoded in said bit areas by the presence or absence of printing thereon, and said bit areas being of uniform and predetermined height and width, the height thereof defining the width of said data line, said data line information being encoded in dibits, and
said plurality of data lines together defining an encoded data portion of said data strip.

5. A data strip as in claim 4 including multiple parity check means.

6. A data strip as in claim 5 in which said multiple parity check means comprises two parity codes in each said data line, one code based upon alternate dibits in said data line and the other code based upon the dibits in said data line between said alternate dibits.

7. A data strip as in claim 4 in which said printing is of material absorbent to infrared light.

8. A data strip as in claim 4 in which said data line information is encoded sequetially along its respective data line and in which the information carried by said data portion is encoded in said data line sequentially in the other said lines are positioned in said data portion.

9. A data strip as in claim 4 including printed alignment patterns for controlling aligment of said optical scanner relative to said data lines.

10. A data strip carrying encoded information to be read by a reader including an optical scanner adapted to continuously scan said strip and derive angle and scanning rate information from said data strip, said data strip including
a substrate of sheet material having printed indicia thereon,
said indicia including
(a) an encoded information portion formed of a plurality of aligned, contiguous, parallel data lines of uniform length formed of bit areas with the presence or absence of printing therein serially encoding information, said bit areas being of uniform height and width, said data lines being transverse to the longitudinal dimension of said data strip, and the encoded information on said data lines being sequential from one end of said information portion to the other, thereby defining a beginning and an end for said information portion,
(b) a horizontal synchronization section preceding said encoded information portion and having demarcation edges parallel to said data lines, to provide angular position information prior to scanning said encoded information portion,
(c) a vertical synchronization section preceding said encoded information portion, said vertical synchronization section including data as to the dimensions of said data bits, and
(d) a pair of alignment guidelines parallel to said longitudinal dimension of said data strip, said guidelines being positioned proximate to opposite ends of said data lines and having patterns congruent with said data lines, whereby said encoded information in said data strip may be read by an optical scanner scanning said strip transversely as it moves longitudinally thereof and angular position data and rate of scanning data may be derived from said encoded information portion.

11. A data strip as in claim 10 in which said substrate is paper.

12. A data strip as in claim 10 in which said horizontal synchronization section includes encoded data as to the number of said data bits in each said data line.

13. A data strip as in claim 10 in which said horizontal synchronization section includes a plurality of longitudinal bars, symmetrical across the width of said strip, and there are an even number of said bars.

14. A data strip carrying encoded information to be scanned by a reader, which said reader includes an optical scanner having its angular positioning and scanning rate adapted to be controlled by scanned information from said data strip,
said data strip including a substrate of sheet material having printed indicia thereon, said indicia including,
(a) an encoded information portion to be read by said reader and formed of a plurality of contiguous, parallel data lines of uniform length, said data lines being formed of printed data bits of serially-encoded information, said data lines being of uniform width and transverse to the longitudinal dimension of said data strip, and said encoded information on said lines being sequential from one end of said information portion to the other, thereby defining a beginning and an end for said information portion, guidelines along said data lines, said alignment guidelines being parallel to said longitudinal dimension of said data strip, and having patterned shapes congruent with said data lines, whereby said lines provide information to said scanner for positioning of said scanner with respect to said data lines, (c) a vertical synchronization section preceding said information portion, said section having bars parallel to said longitudinal dimension, encoding information as to the height of the bits in said data lines, for timing control of said scanner, and (d) a horizontal synchronization section preceding said information portion, said horizontal synchronization section having areas parallel to said data lines which may be read by said scanner to control the angle of said scanner relative to said data lines, whereby scanning of said data strip will provide data to control said positioning and scanning rate in said reader thereby positioning and aligning said reader during scanning of said data bits and controlling the number of times each data line is scanned.

15. A data strip as set forth in claim 14 in which said horizontal synchronization section includes encoded information as to the number of said data bits in said data lines.

16. A data strip as set forth in claim 14 including information encoded in the data lines at the beginning of said encoded information portion providing a start-read signal to said scanner.

17. A substrate having a scanning area with a data strip printed thereon for reading by a scanner, said data strip being in a predetermined format of contiguous data lines running transversely of the longitudinal dimension of said strip, said data lines including bit areas of uniform height and width and encoding data by the presence or absence of printing in said bit areas, said data strip including scanner control information preceding said data lines, and printed positioning idicia on said substrate but outside said scanning area in predetermined location with respect to said data strip to permit initial user alignment of said data strip with said scanner.

18. A substrate as set forth in claim 17 in which there are at least two said printed positioning indicia, said indicia are of different shapes, and one of said indicia precedes and is to one side of said data strip.

19. A data strip containing a plurality of encoded data bits for sequential scanning by an optical scanner, said strip including a paper-like substrate, a plurality of aligned, contiguous, parallel data lines, each said line being formed of contiguous bit areas, information being sequentially encoded in said bit areas by the presence or absence of printing thereon, and said bit areas being of uniform and predetermined height and width, the height thereof defining the width of said data line, said data lines running transversely of the longitudianl direction of said data strip, said plurality of data lines together defining an encoded data portion of said data strip, and printed pattern areas running proximate to the end of said data lines, said patterned areas being formed of bit areas of the same height and width as the said bit areas in said data lines and being congruent with said data lines, whereby data alignment information may be provided to said scanner.

* * * * *

UNITED STATES PATENT AND TRADEMARK OFFICE
CERTIFICATE OF CORRECTION

PATENT NO. : 4,782,221

DATED : November 1, 1988

INVENTOR(S) : Robert L. Brass et al

Page 1 of 3

It is certified that error appears in the above-identified patent and that said Letters Patent is hereby corrected as shown below:

Insert figures 1-6 as part of Letters Patent as shown on the attached sheets.

Signed and Sealed this

Twenty-first Day of November, 1989

Attest:

JEFFREY M. SAMUELS

*Attesting Officer*   *Acting Commissioner of Patents and Trademarks*